C. M. FOOTE.
GUARD.
APPLICATION FILED MAR. 20, 1920.
1,350,797.
Patented Aug. 24, 1920.
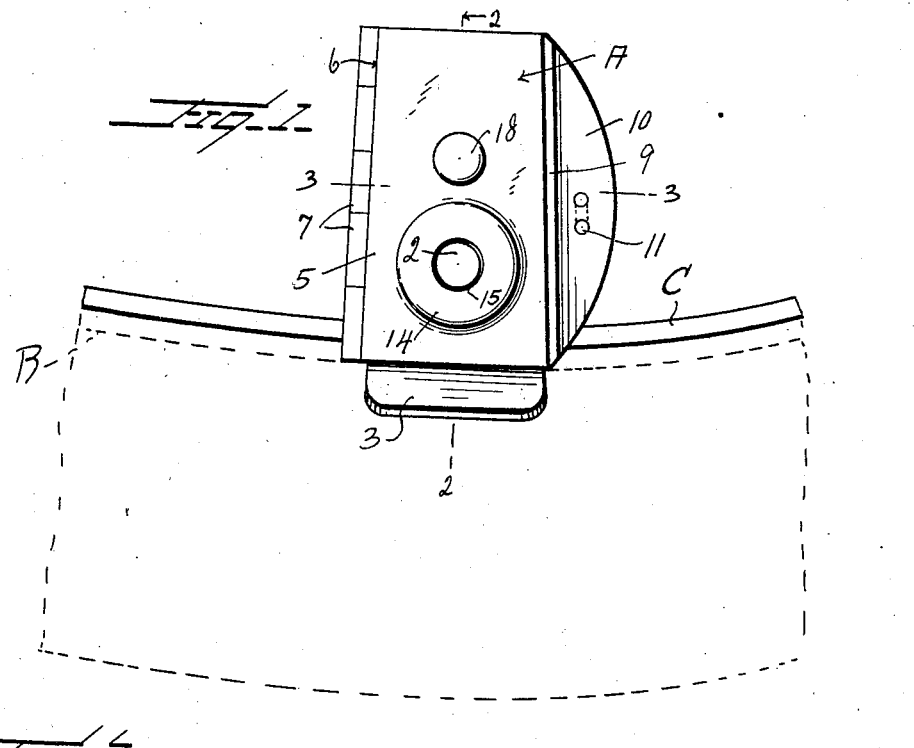
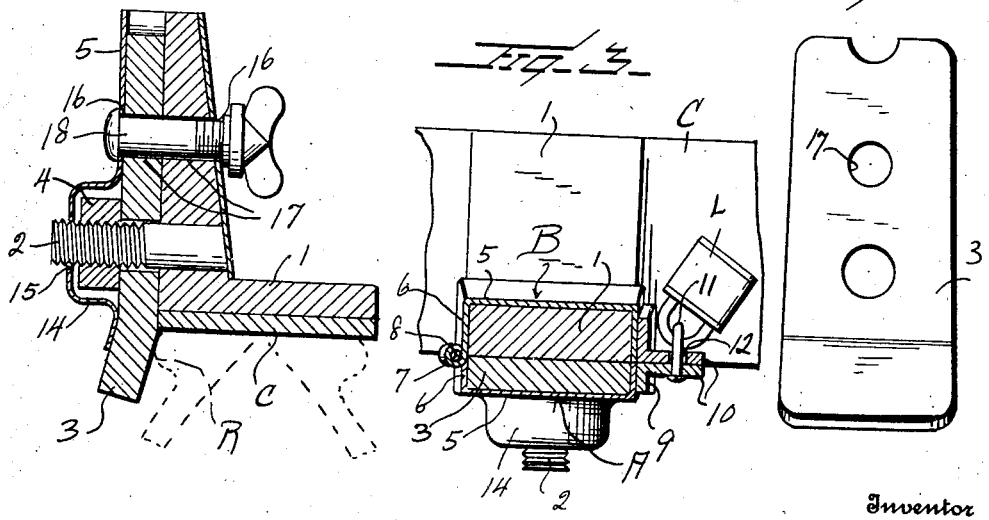
Inventor
C. M. Foote
By Watson E. Coleman
Attorney

UNITED STATES PATENT OFFICE.

CHARLES M. FOOTE, OF NASHUA, NEW HAMPSHIRE.

GUARD.

1,350,797.  Specification of Letters Patent.  Patented Aug. 24, 1920.

Application filed March 20, 1920. Serial No. 367,314.

*To all whom it may concern:*

Be it known that I, CHARLES M. FOOTE, a citizen of the United States, residing at Nashua, in the county of Hillsborough and State of New Hampshire, have invented certain new and useful Improvements in Guards, of which the following is a specification, reference being had to the accompanying drawings.

This invention relates to certain improvements in guards and has relation more particularly to a device of this general character especially designed and adapted for use in connection with the holding lug of a carrier for spare tires, and it is an object of the invention to provide a novel and improved device of this general character which, when applied, serves to reduce to a minimum the possibility of the removal of the spare tire from the carrier by an unauthorized person.

Another object of the invention is to provide a novel and improved device of this general character comprising an inclosing frame or housing consisting of relatively movable sections adapted to substantially inclose the clamping nut coacting with the holding lug carried by the carrier, together with means for locking the sections of the housing or frame in applied position.

The invention consists in the details of construction and in the combination and arrangement of the several parts of my improved guard whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:

Figure 1 is a fragmentary view in elevation, illustrating a guard constructed in accordance with an embodiment of my invention and in applied position, the coacting spare tire being indicated by dotted lines;

Fig. 2 is a sectional view taken substantially on the line 2—2 of Fig. 1;

Fig. 3 is a sectional view taken substantially on the line 3—3 of Fig. 1; and

Fig. 4 is a view in elevation of the holding lug unapplied.

As disclosed in the accompanying drawings, C denotes the lower portion of a carrier for a spare tire of a character now generally in use and particularly in connection with the well known make of Buick car. Secured to the inner face of said carrier C at substantially the lowermost part thereof is an upstanding bracket 1 provided with a forwardly directed bolt or threaded shank 2 upon which is mounted for swinging movement the holding lug 3. The holding lug 3 coacts with the rim R of a spare tire when applied to the carrier C to effectively hold the same against displacement therefrom. Threaded upon the outer end portion of the bolt or shank 2 is the clamping nut 4 which coacts with the holding lug 3 to maintain said lug in working position with respect to the rim R of the spare tire.

My improved guard comprises two substantially duplicate sections, A and B. Each of the sections A and B comprises a side plate 5 of requisite dimensions and provided along one longitudinal margin with an inwardly directed flange 6. The flanges 6 of the sections A and B are provided with the intermeshing knuckles 7, through which a suitable pintle member 8 is directed whereby the sections A and B are hingedly connected for relative swinging movement. The opposite longitudinal marginal portion of the side plate 5 of each of the sections A and B is defined by an inwardly directed flange 9, terminating in the outwardly directed flange 10. The flange 10 of the section A of the guard is provided with a staple 11 which extends through a slot or opening 12 produced in the flange 10 of the section B when the sections A and B are in closed relation. A padlock L or other suitable locking means is engaged with the portion of the staple 11 extending beyond the flange 10 of the section B whereby the sections A and B may be held in closed position with the possibility substantially eliminated of the guard being removed from applied position by an unauthorized person.

In applying the guard, the sections A and B are closed around the bracket 1 and the adjacent portion of the holding lug 3 when said lug is in proper position to engage the rim R of the spare tire. The side plate 5 of the section A has pressed outwardly therefrom a protuberance or casing 14 in which is received the clamping nut 4 and the central portion of the wall of said casing or protuberance 14 is provided with an opening 15 through which the outer or free end portion of the bolt or shank 2 extends. By this means, the guard, when applied, prevents access being had to the nut 4 so that the spare tire applied to the carrier C can only be removed after the guard has been taken from applied position.

The side plates 5 of the sections A and B are provided with the openings 16 which, when the guard is in applied or working position, register with the coinciding openings 17 formed in the holding lug 3 and in the bracket 1. The shank of a headed member or bolt 18 is directed through these openings 16 and 17 and a clamping nut, preferably of a winged type, is engaged with the shank of said headed member or bolt whereby additional means are provided for holding the guard in applied position and for holding the lug 3 against movement into an inoperative position.

From the foregoing description, it is thought to be obvious that a guard constructed in accordance with my invention is particularly well adapted for use by reason of the convenience and facility with which it may be assembled and operated, and it will also be obvious that my invention is susceptible of some change and modification without departing from the principles and spirit thereof, and for this reason, I do not wish to be understood as limiting myself to the precise arrangement and formation of the several parts herein shown in carrying out my invention in practice except as hereinafter claimed.

I claim:—

1. In combination with a bracket provided with an outstanding shank, a member through which said shank is disposed and a clamping nut engaged with the shank, a guard comprising two hingedly connected sections adapted to substantially snugly embrace the bracket and adjacent portion of the member, a wall of the guard being provided with an outstanding housing to receive the clamping nut, means for locking the sections against separating movement when applied, and additional means for securing the guard to the bracket and the member.

2. In combination with a bracket provided with an outstanding shank, a member through which said shank is disposed and a clamping nut engaged with the shank, a guard comprising two hingedly connected sections adapted to substantially snugly embrace the bracket and adjacent portion of the member, a wall of the guard being provided with an outstanding housing to receive the clamping nut, means for locking the sections against separating movement when applied, and additional means coacting with the sections of the guard and with the bracket and member for holding the guard in applied position.

3. In combination with a bracket provided with an outstanding shank, a member through which said shank is disposed and a clamping nut engaged with the shank, a guard comprising two hingedly connected sections adapted to substantially snugly embrace the bracket and adjacent portion of the member, a wall of the guard being provided with an outstanding housing to receive the clamping nut, means for locking the sections against separating movement when applied, and additional means for securing the guard to the bracket and the member and for holding the member against movement relative to the shank.

4. In combination with a bracket provided with an outstanding shank, a member pivotally engaged with the shank, a guard comprising two hingedly connected sections adapted to substantially snugly embrace the bracket and adjacent portions of the member, means for locking the sections against separating movement when applied, said bracket and member being provided with registering openings when the member is in one position relative to the bracket, the sections of the guard being provided with openings registering, when the guard is applied, with the first named openings, a headed member disposed through said registering openings, and a holding member engageable with the free end portion of said headed member when applied.

In testimony whereof I hereunto affix my signature.

CHARLES M. FOOTE.